United States Patent
Chakra et al.

(10) Patent No.: US 9,766,797 B2
(45) Date of Patent: Sep. 19, 2017

(54) SHORTENING URLS USING TOUCHSCREEN GESTURES

(75) Inventors: Al Chakra, Apex, NC (US); John A. Feller, Cary, NC (US); Trudy L. Hewitt, Cary, NC (US); Francesco Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 887 days.

(21) Appl. No.: 13/613,780

(22) Filed: Sep. 13, 2012

(65) Prior Publication Data

US 2014/0075292 A1 Mar. 13, 2014

(51) Int. Cl.
| | |
|---|---|
| *G06F 3/0488* | (2013.01) |
| *G06F 17/24* | (2006.01) |
| *G06F 3/041* | (2006.01) |
| *G06F 3/048* | (2013.01) |
| *G06F 17/22* | (2006.01) |
| *G06F 17/30* | (2006.01) |

(52) U.S. Cl.
CPC ............ *G06F 3/0488* (2013.01); *G06F 3/041* (2013.01); *G06F 3/048* (2013.01); *G06F 17/2264* (2013.01); *G06F 17/24* (2013.01); *G06F 17/30887* (2013.01)

(58) Field of Classification Search
CPC .......................... G06F 17/2795; G06F 3/0488
See application file for complete search history.

(56) References Cited

U.S. PATENT DOCUMENTS

| | | | | |
|---|---|---|---|---|
| 7,602,379 | B2 * | 10/2009 | Lemon .................. | G06F 3/0488 178/18.01 |
| 7,698,269 | B2 | 4/2010 | Zhou et al. | |
| 8,281,232 | B2 * | 10/2012 | Vishria et al. ................ | 715/208 |
| 8,782,550 | B1 * | 7/2014 | Patridge ................ | G06F 3/0488 715/702 |
| 8,896,552 | B2 * | 11/2014 | Tan ........................ | G06F 3/0488 345/173 |
| 8,928,610 | B2 * | 1/2015 | Matsumura ......... | G06F 3/04883 345/156 |

(Continued)

FOREIGN PATENT DOCUMENTS

JP  WO 2011118096 A1 *  9/2011  ......... G06F 3/04883

OTHER PUBLICATIONS

Bell, Melissa. "The Libyan connection behind .ly url shorteners", Apr. 15, 2011 The Washington Post.*

(Continued)

*Primary Examiner* — Kavita Padmanabhan
*Assistant Examiner* — Tyler Schallhorn
(74) *Attorney, Agent, or Firm* — DeLizio Law, PLLC (57) ABSTRACT

Some embodiments of the inventive subject matter may include a method shortening text on a touchscreen computing device. The method can include detecting touch input on a touchscreen. The method can include determining a selected input text appearing on the touchscreen. The method can include determining the selected input text to be shortened. The method can include determining a length of a shortened output text. The method can include transmitting the selected input text and the length of the shortened output text to an external shortener for shortening and registration. The method can include presenting the shortened output text on the touchscreen.

18 Claims, 10 Drawing Sheets

(56) References Cited

U.S. PATENT DOCUMENTS

| | | | |
|---|---|---|---|
| 2002/0190965 A1* | 12/2002 | Lemon | G06F 3/0488 345/179 |
| 2007/0124414 A1 | 5/2007 | Bedingfield et al. | |
| 2009/0225037 A1 | 9/2009 | Williamson et al. | |
| 2011/0107206 A1* | 5/2011 | Walsh | G06F 17/2785 715/256 |
| 2011/0264992 A1* | 10/2011 | Vishria | G06F 17/30887 715/208 |
| 2011/0265021 A1 | 10/2011 | Chien et al. | |
| 2011/0298724 A1 | 12/2011 | Ameling et al. | |
| 2012/0044179 A1 | 2/2012 | Hudson | |
| 2012/0072838 A1* | 3/2012 | Ramachandra | 715/271 |
| 2012/0306772 A1* | 12/2012 | Tan | G06F 3/0488 345/173 |
| 2012/0327003 A1* | 12/2012 | Matsumura | G06F 3/04883 345/173 |
| 2013/0073745 A1* | 3/2013 | Bilinski et al. | 709/246 |
| 2013/0104038 A1* | 4/2013 | Galper et al. | 715/271 |
| 2014/0289618 A1* | 9/2014 | Partridge | G06F 3/0488 715/271 |
| 2015/0277744 A1* | 10/2015 | Tang | G06F 3/04883 715/863 |

OTHER PUBLICATIONS

"tough.ly/treated", Oct. 14, 2011 The Economist.*
Madhvanath, S. , "Pen gesture-based access to one-to-many hyperlinks", Research Disclosure, No. 528, Kenneth Mason Publications, England Apr. 10, 2008 , 3 page.

* cited by examiner

SHORTENING URLS USING TOUCHSCREEN GESTURES

BACKGROUND

Embodiments of the inventive subject matter generally relate to the field of computer file paths, and, more particularly, website uniform resource locators.

Webpages are typically accessed by entering the webpage's uniform resource locator (URL) into a web browser. In colloquial terms, a URL is often referred to as a web address when the URL designates the location of a webpage. Although some URLs are short, others can be quite long (i.e. the URL of a webpage buried deep within a complex website). URLs typical comprise three or four parts—1. A scheme, 2. a host, 3. a path, and 4. a query string. For a URL, the scheme is usually "HTTP" or "HTTPS." The host name identifies the host which holds the resource being accessed, i.e. www.[host-name].com. The path follows the host name and identifies specific resources within the host website to be accessed. i.e. www.[host-name].com/path1/path2/etc. Finally, a query string (if one exists), follows the path.

Often times, users of computing devices find it useful to share URLs with one another. This is typically done using email, short message service (SMS or text) messages, or multimedia messaging service (MMS) messages. Additionally, users may wish to share URLs via twitter or other social networking websites. Some of these methods of sharing (specifically SMS and twitter) greatly restrict the number of characters that can be shared. For example, SMS messages are limited to 160 characters. As such, without URL shortening, some URLs may not be able to be shared via these services. There exist several URL "shorteners" (i.e. the Bitly™ URL shortening service provided by Bitly, Inc., the TinyURL™ URL shortening service provided by TinyURL LLC, the Ow.ly URL shortening service provided by Hootsuite Media Inc., the Ht.ly URL shortening service provided by Hootsuite Media Inc., the Google URL Shortner™ URL shortening service provided by Google Inc., etc.). Typically, a user will shorten a URL by visiting a website (such as by entering "bit.ly.com," "tinyurl.com," "ow.ly," "ht.ly," or "goo.gl" into the web browser address bar for any of the aforementioned URL shortening services), and entering the URL they wish to shorten into a designated URL shortening section on the website. The URL shortener may then generate a new, significantly shorter URL.

SUMMARY

Some embodiments of the inventive subject matter may include a method shortening text on a touchscreen computing device. The method can include detecting touch input on a touchscreen. The method can include determining a selected input text appearing on the touchscreen. The method can include determining the selected input text to be shortened. The method can include determining a length of a shortened output text. The method can include transmitting the selected input text and the length of the shortened output text to an external shortener for shortening and registration. The method can include presenting the shortened output text on the touchscreen.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. For instance, although examples refer to shortening URLs, the same techniques may be employed to shorten words having known abbreviations. In other instances, well-known instruction instances, protocols, structures and techniques have not been shown in detail in order not to obfuscate the description.

Many users utilize URL sharing on mobile devices. A large number of these mobile devices utilize touchscreens, which may enable the user to interact with the device by simply touching, or gesturing, on the touchscreen display. The inventive subject matter may allow a user to shorten URLs without having to manually access a website, or other technology, for shortening URLs. Instead of manually accessing a URL shortening website, a user may be able to use familiar gestures, such as "pinching," to shorten a URL to a desired length. Similarly, the inventive subject matter may allow a user to expand a shortened URL to a longer length by placing two fingers on the shortened text and spreading the fingers apart. Both the shortening and lengthening features may be used with URLs, as well as abbreviations or any other text suitable to shortening/expanding.

Figure 1A:
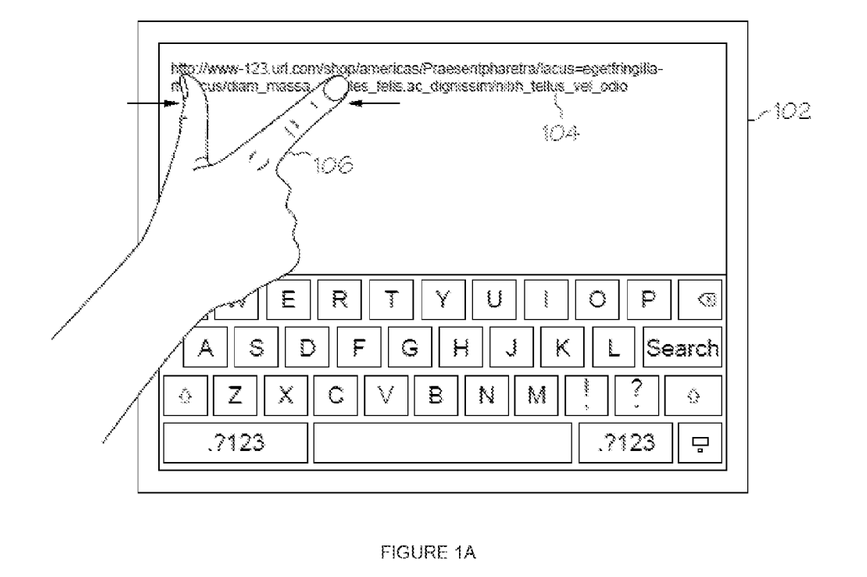
FIG. 1a depicts a user 106 beginning a gesture on a URL 104 on a touchscreen device 102 to shorten the URL 104.

FIG. 1a depicts a user 106 beginning a gesture on a URL 104 on a touchscreen device 102 to shorten the URL 104. In FIG. 1a the user 106 begins the gesture by placing two fingers on the touchscreen of the touchscreen device 102. The user places the fingers on top of the URL 104 (or other text desired to be shortened). The user 106 then moves the two fingers together in a pinching motion to shorten the URL 104. In some embodiments of the inventive subject matter, more than two fingers can be used. For example, a user may use three fingers—the user may place two fingers on a relevant portion of the URL indicating that the user 106 desires to retain the portion of the URL between the two fingers. The third finger may then be moved toward the other two fingers, shortening the URL while retaining the desired portion.

Figure 1B:
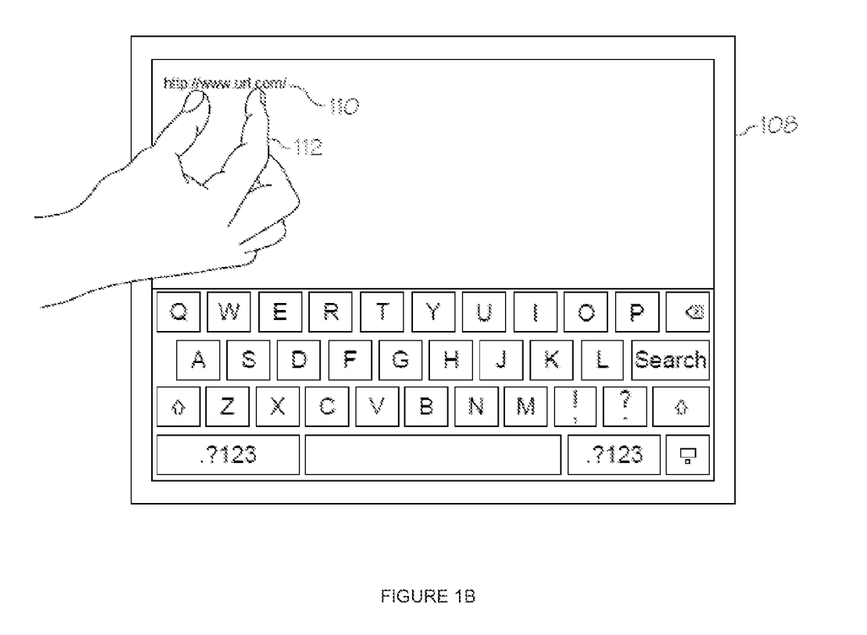
FIG. 1b depicts a user 112 completing a gesture on a URL 110 on a touchscreen device 108.

FIG. 1b depicts a user 112 completing a gesture on a URL 110 on a touchscreen device 108. In FIG. 1b the user 112 has completed the gesture by pinching the two fingers together. The resulting URL 110 is the shortened URL 110.

Figure 2A:
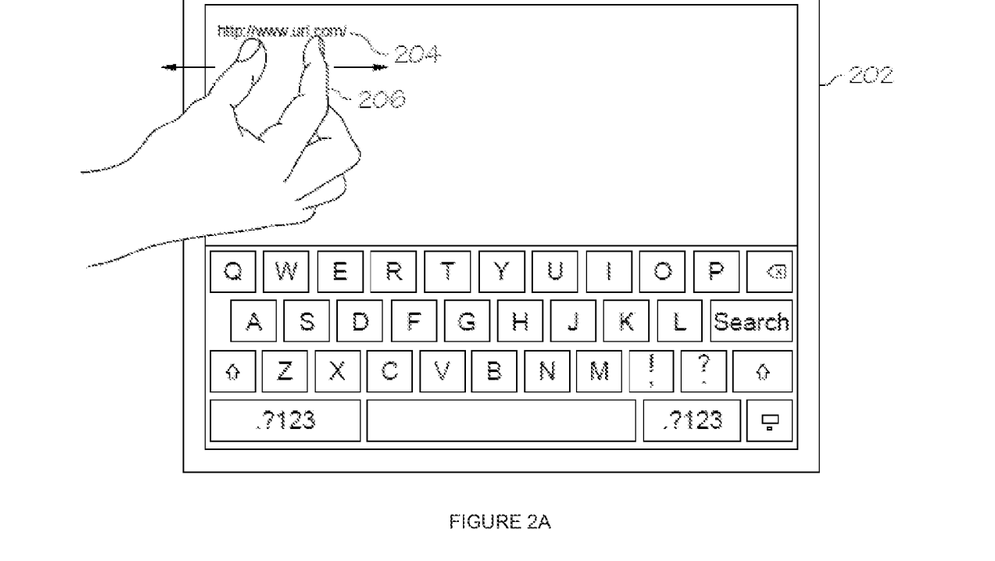
FIG. 2a depicts a user 206 beginning a gesture on a URL 204 on a touchscreen device 202 to expand the URL 204.

FIG. 2a depicts a user 206 beginning a gesture on a URL 204 on a touchscreen device 202 to expand the URL 204. In FIG. 2a the user 206 begins the gesture by placing two fingers on the touchscreen of the touchscreen device 202. The user 206 places the fingers on top of the URL 204 (or other text desired to be expanded). The user 206 then moves the fingers apart in a reverse-pinching motion to expand the URL 204.

Figure 2B:
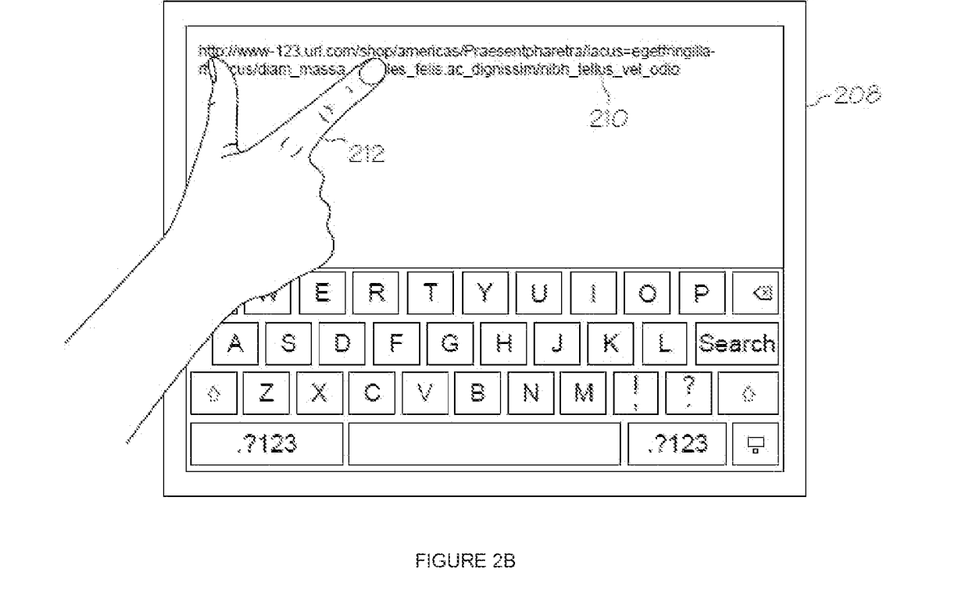
FIG. 2b depicts a user 212 completing a gesture on a URL 210 on a touchscreen device 208 to expand the URL 210.

FIG. 2b depicts a user 212 completing a gesture on a URL 210 on a touchscreen device 208 to expand the URL 210. In FIG. 2b the user 212 has completed the gesture by moving the two fingers apart. The resulting URL 210 is the expanded URL 210.

Figure 3:
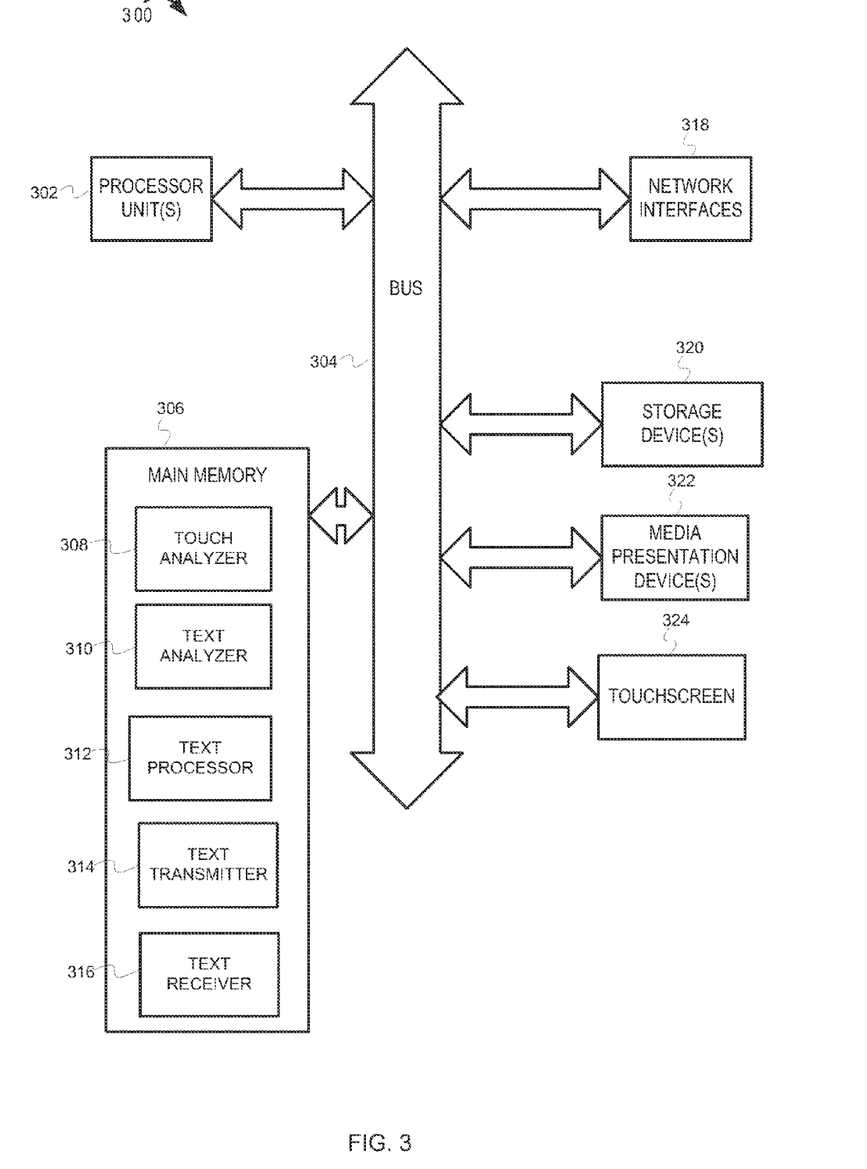
FIG. 3 is a block diagram of a URL shortening/expanding device 300.

FIG. 3 is a block diagram of a URL shortening/expanding device 300. The URL shortening/expanding device 300 includes a processor unit 302 (possibly including multiple processors, multiple cores, multiple nodes, and/or implementing multi-threading, etc.). The URL shortening/expanding device 300 includes memory 306. The memory 306 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The URL shortening/expanding device 300 also includes a bus 304 (e.g., PCI, ISA, PCI-Express, HyperTransport®, InfiniBand®, NuBus, etc.), a network interface 318 (e.g., an ATM interface, an Ethernet interface, a Frame Relay interface, SONET interface, wireless interface, etc.), and a storage device(s) 320 (e.g., optical storage, magnetic storage, etc.). The system memory 306 embodies functionality to implement embodiments described above. The system memory 306 may include a touch analyzer 308, a text analyzer 310, a text processor 312, a text transmitter 314, and a text receiver 316. Any one of these functionalities may be partially (or entirely) implemented in hardware and/or on the processing unit 302. For example, the functionality may be implemented with an application specific integrated circuit, in logic implemented in the processing unit 302, in a co-processor on a peripheral device or card, etc. Further, realizations may include fewer or additional components not illustrated in FIG. 3 (e.g., video cards, audio cards, additional network interfaces, peripheral devices, etc.). The processor unit 302, the storage device(s) 320, and the network interface 318 are coupled to the bus 304. Although illustrated as being coupled to the bus 304, the memory 306 may be coupled to the processor unit 302.

In FIG. 3, user input is captured via the touchscreen 324. The touch analyzer 308 processes the user input and determines if the user input is input with respect to text. The text analyzer 310 analyzes the text to determine if it is text that is suitable to shortening/expanding. In some embodiments of the inventive subject matter, the text processor 312 will determine the appropriate shortened/expanded characteristics of the text. In other embodiments utilizing an external mechanism for shortening/expanding text, the text transmitter 314 will transmit the text to be shortened/expanded to an external shortening/expanding mechanism. The text receiver 316 will receive the shortened/expanded text from the external shortening/expanding mechanism. The media presentation device 322 will display the shortened/expanded text.

Figure 4:
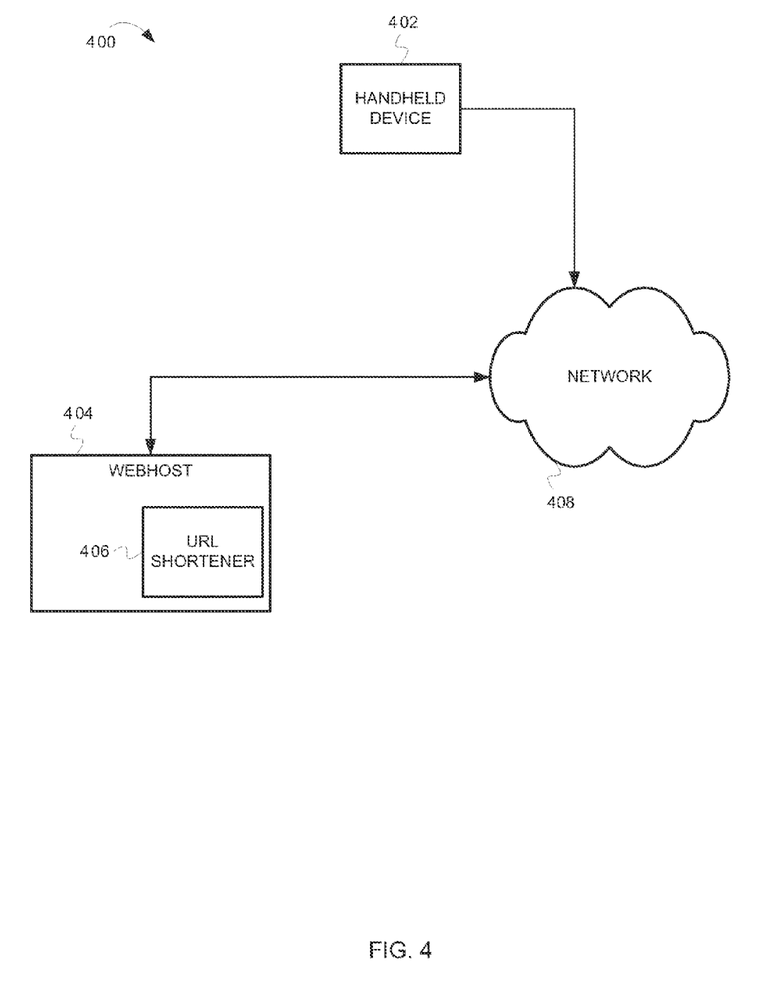
FIG. 4 is a block diagram of a network 400 over which a URL shortening/expanding device may interact and operate with an external mechanism for shortening/expanding a URL.

FIG. 4 is a block diagram of a network 400 over which a URL shortening/expanding device may interact and operate with an external mechanism for shortening/expanding a URL. The handheld device 402 will connect to the network 408. The URL to be shortened/expanded will be transmitted over the network 408 to the webhost 404. The webhost 404 will utilize its URL shortener 406 to shorten/expand the URL. Additionally, if the URL is being shortened, the webhost 404 will register the shortened URL. The webhost 404 will then transmit the shortened/expanded URL over the network 408 back to the handheld device 402.

Figure 5:
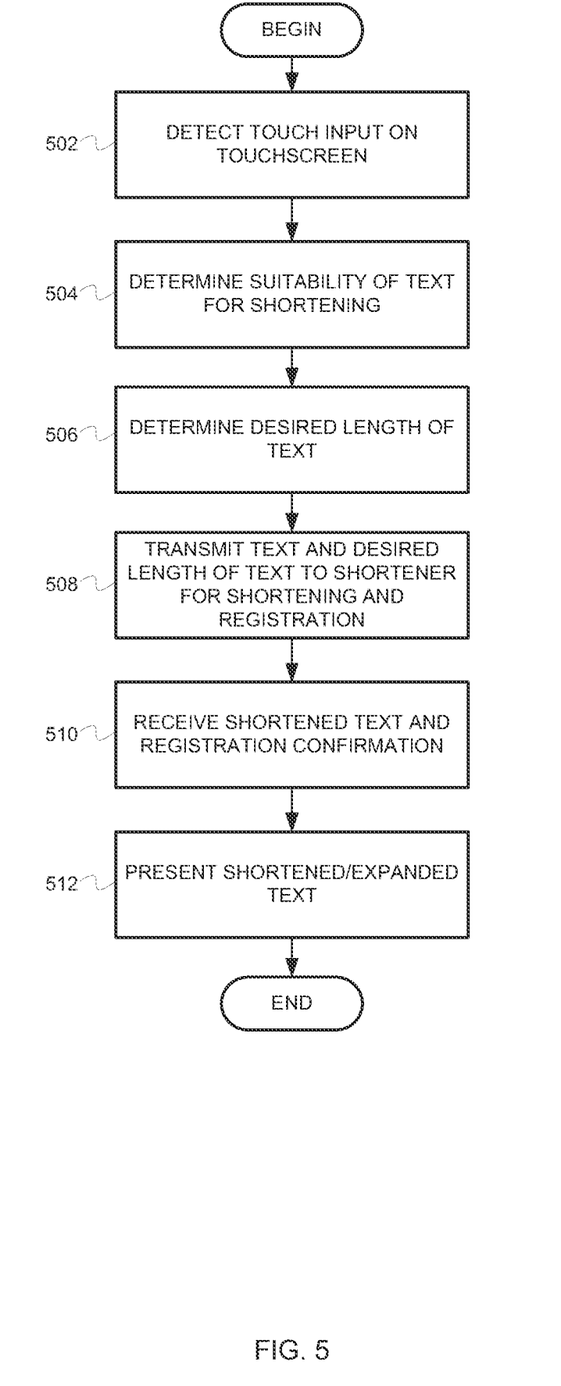
FIG. 5 is a flow diagram illustrating the steps a URL shortening/expanding device may employ in utilizing an external shortening mechanism.

FIG. 5 is a flow diagram illustrating the steps a URL shortening/expanding device may employ in utilizing an external shortening mechanism. The flow begins at block 502. At block 502, the URL shortening/expanding device detects touch input on the touchscreen. The flow continues at block 504.

At block 504, the URL shortening/expanding device determines the suitability of the text for shortening. The flow continues at block 506.

At block 506, the URL shortening/expanding device determines the desired length of the shortened text. In some embodiments, the length may be indicated by user input. In other embodiments, the length may be determined by the default rules of the external shortening/expanding mechanism. The flow continues at block 508.

At block 508, the URL shortening/expanding device transmits the text to be shortened/expanded to the external shortening/expanding mechanism. If the user input indicates the desired length of the shortened text, the URL shortener/expander transmits the desired length. The external shortening/expanding mechanism shortens or expands the text. If the text is being shortened, the external shortening/expanding mechanism registers the original and shortened text. The flow continues at block 510.

At block 510, the URL shortening/expanding device receives the shortened/expanding text from the external shortening/expanding mechanism. If the text was registered, the URL shortening/expanding device also receives confirmation of registration. The flow continues at block 512.

At block 512, the URL shortening/expanding device presents the shortened/expanded text.

Figure 6:
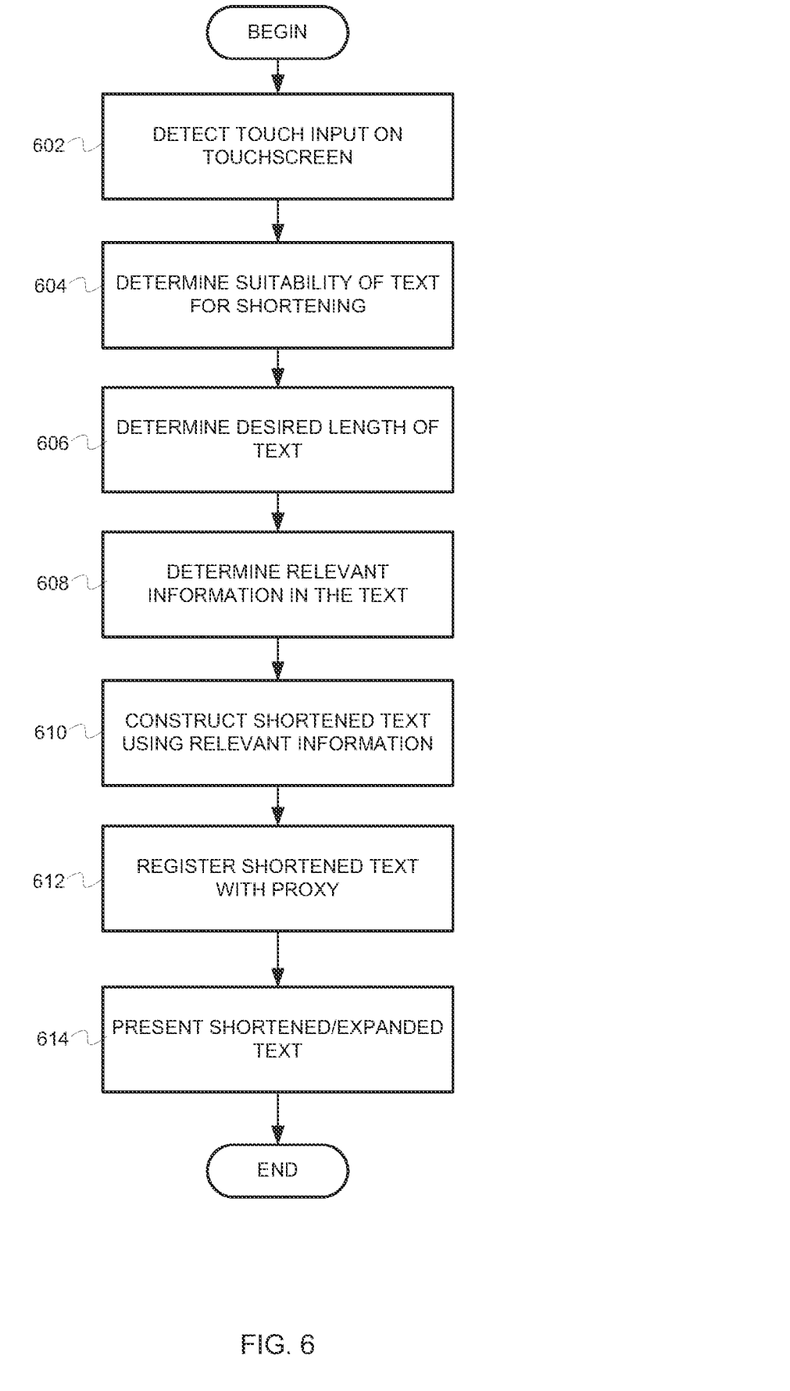
FIG. 6 is a flow diagram illustrating the steps a URL shortening/expanding device may employ in utilizing an internal shortening mechanism.

FIG. 6 is a flow diagram illustrating the steps a URL shortening/expanding device may employ in utilizing an internal shortening mechanism. The flow begins at block

602. At block 602 the URL shortening/expanding devices detects touch input on the touchscreen. The flow continues at block 604.

At block 604, the URL shortening/expanding device determines the suitability of the text for shortening. The flow continues at block 606.

At block 606, the URL shortening/expanding device determines the desired length of the shortened text. In some embodiments, the desired length is indicated by the user. In other embodiments, the URL shortening/expanding device determines the length by its default shortening/expanding rules. The flow continues at block 608.

At block 608, the URL shortening/expanding device may determine the relevant information in the text. For example, in the context of a URL, the host name may be determined to be relevant information. Additionally, parts of the path may be deemed relevant. The flow continues at block 610.

At block 610, the URL shortening/expanding device constructs the shortened text. In some embodiments, the URL shortening/expanding device may shorten the text using the relevant information from the text. The flow continues at block 612.

At block 612, the URL shortening/expanding device registers the shortened text with a proxy website. In the context of a URL, the proxy website may take the shortened URL and redirect the request to the original, full-length URL. The flow continues at block 614.

At block 614, the URL shortening/expanding devices presents the shortened/expanded text.

Figure 7A:
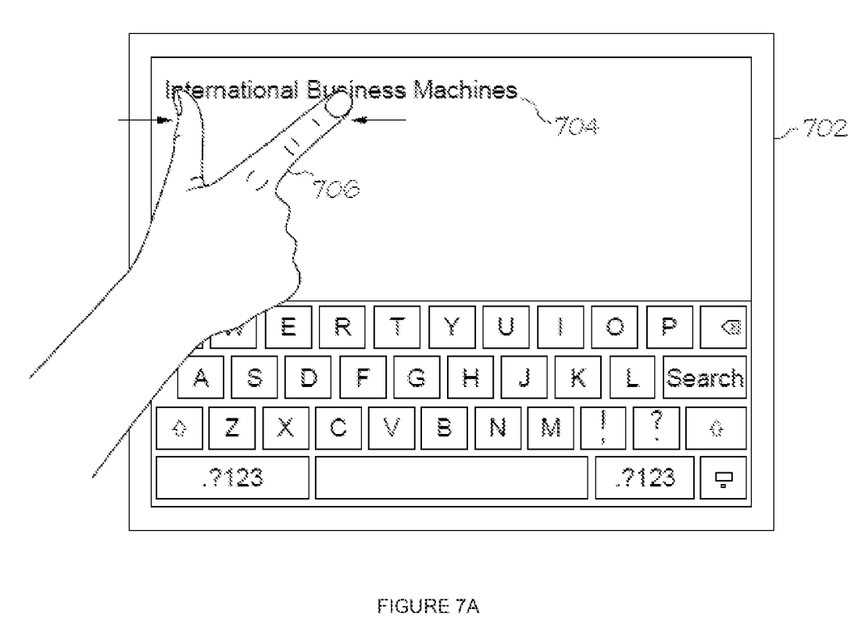
FIG. 7a depicts a user 706 beginning a gesture on a phrase 704 on a touchscreen device 702 to shorten the phrase 704 into an acronym.

FIG. 7*a* depicts a user 706 beginning a gesture on a phrase 704 on a touchscreen device 702 to shorten the phrase 704 into an acronym. In FIG. 7*a* the user 706 begins the gesture by placing two fingers on the touchscreen of the touchscreen device 702. The user 706 places the fingers on top of the phrase 704. The user 706 then moves the fingers together in a pinching motion to shorten the phrase 704 into an acronym.

Figure 7B:
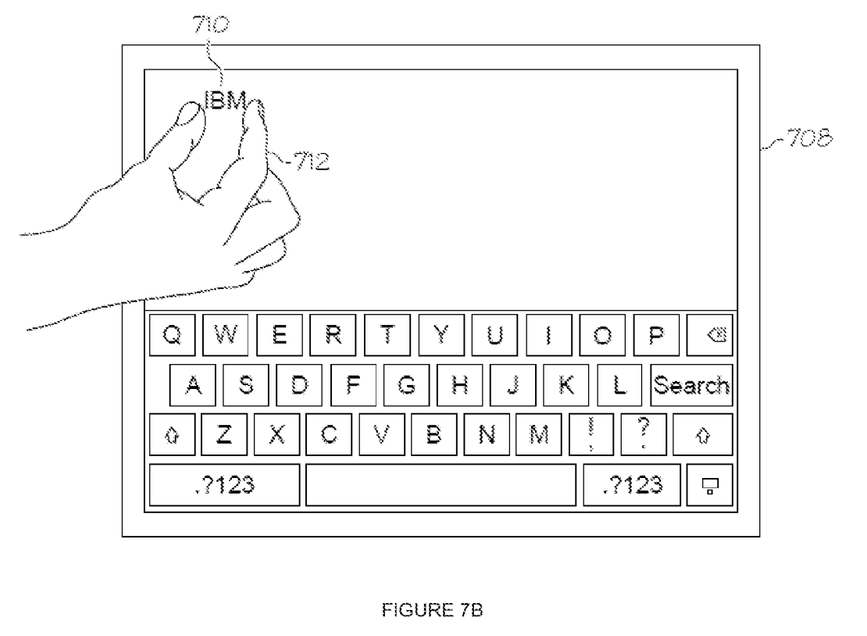
FIG. 7b depicts a user 712 completing a gesture on a phrase on a touchscreen device 708 to shorten the phrase into an acronym 710.

FIG. 7*b* depicts a user 712 completing a gesture on a phrase on a touchscreen device 708 to shorten the phrase into an acronym 710. In FIG. 7*b* the user 712 has completed the gesture by pinching the two fingers together. The resulting text is the acronym 710.

Figure 8A:
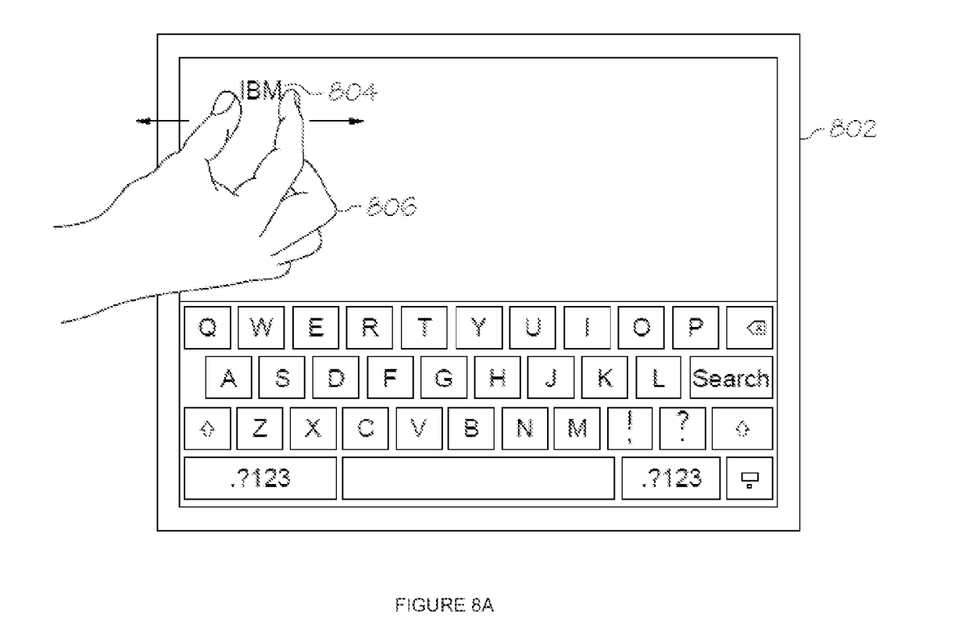
FIG. 8a depicts a user 806 beginning a gesture on an acronym 804 on a touchscreen device 802 to expand the acronym 804 into an acronym.

FIG. 8*a* depicts a user 806 beginning a gesture on an acronym 804 on a touchscreen device 802 to expand the acronym 804 into a phrase. In FIG. 8*a* the user 806 begins the gesture by placing two fingers on the touchscreen of the touchscreen device 802. The user 806 places the fingers on top of the acronym 804. The user then moves the fingers apart in a reverse-pinching motion to expand the acronym 804.

Figure 8B:
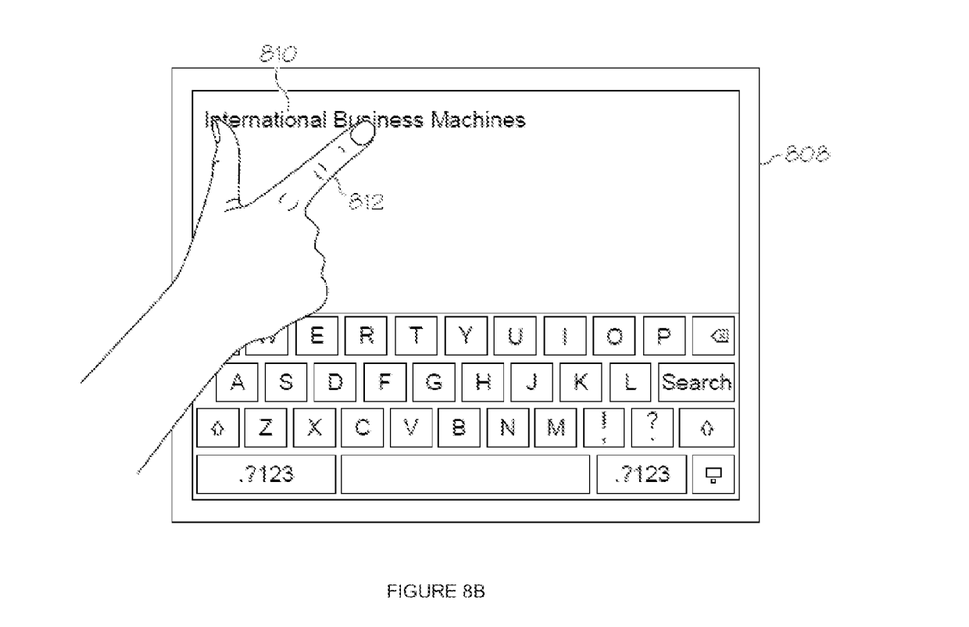
FIG. 8b depicts a user 812 completing a gesture on an acronym on a touchscreen device 808 to expand the acronym into a phrase 810.

FIG. 8*b* depicts a user 812 completing a gesture on an acronym on a touchscreen device 808 to expand the acronym into a phrase 810. In FIG. 8*b* the user 812 has completed the gesture by moving the two fingers apart. The resulting text is the expanded phrase 810.

Figure 9A:
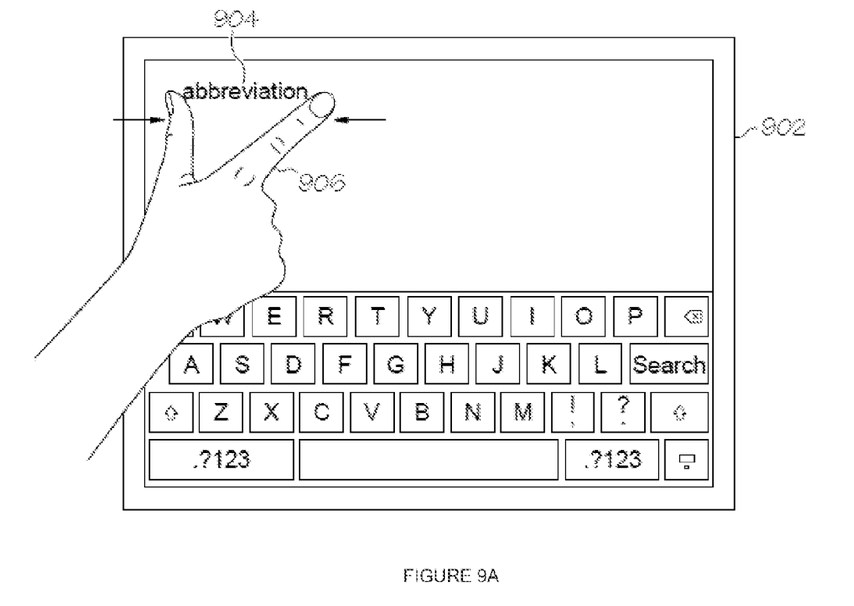
FIG. 9a depicts a user 906 beginning a gesture on a phrase 904 on a touchscreen device 902 to shorten the phrase 904 into an abbreviation.

FIG. 9*a* depicts a user 906 beginning a gesture on a phrase 904 on a touchscreen device 902 to shorten the phrase 904 (the phrase 904 can include one or more words) into an abbreviation. In FIG. 9*a* the user 906 begins the gesture by placing two fingers on the touchscreen of the touchscreen device 902. The user 906 places the fingers on top of the phrase 904 to be abbreviated. The user 906 then moves the two fingers together in a pinching motion to shorten the phrase 904 into an abbreviation.

Figure 9B:
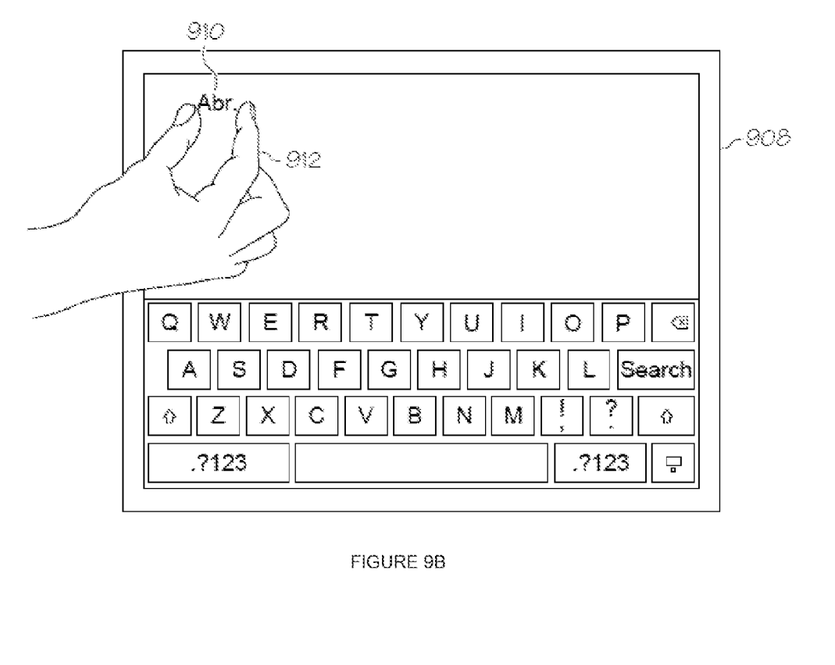
FIG. 9b depicts a user 912 completing a gesture on a phrase on a touchscreen device 908 to shorten the phrase into an abbreviation 910.

FIG. 9*b* depicts a user 912 completing a gesture on a phrase on a touchscreen device 908 to shorten the phrase into an abbreviation 910. In FIG. 9*b* the user 912 has completed the gesture by pinching the two fingers together. The resulting text is the abbreviation 910 of the phrase.

Figure 10A:
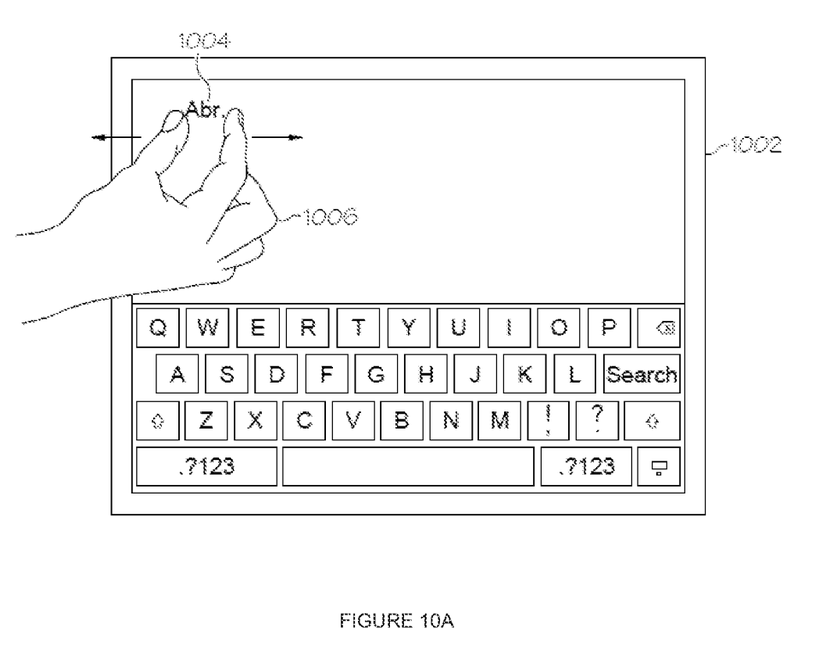
FIG. 10a depicts a user 1006 beginning a gesture on an acronym 1004 on a touchscreen device 1002 to expand the acronym 1004 into a phrase.

FIG. 10*a* depicts a user 1006 beginning a gesture on an acronym 1004 on a touchscreen device 1002 to expand the acronym 1004 into a phrase. In FIG. 10*a* the user 1006 begins the gesture by placing two fingers on the touchscreen of the touchscreen device 1002. The user 1006 places the fingers on top of the abbreviation 1004. The user then moves the fingers apart in a reverse-pinching motion to expand the abbreviation 1004.

Figure 10B:
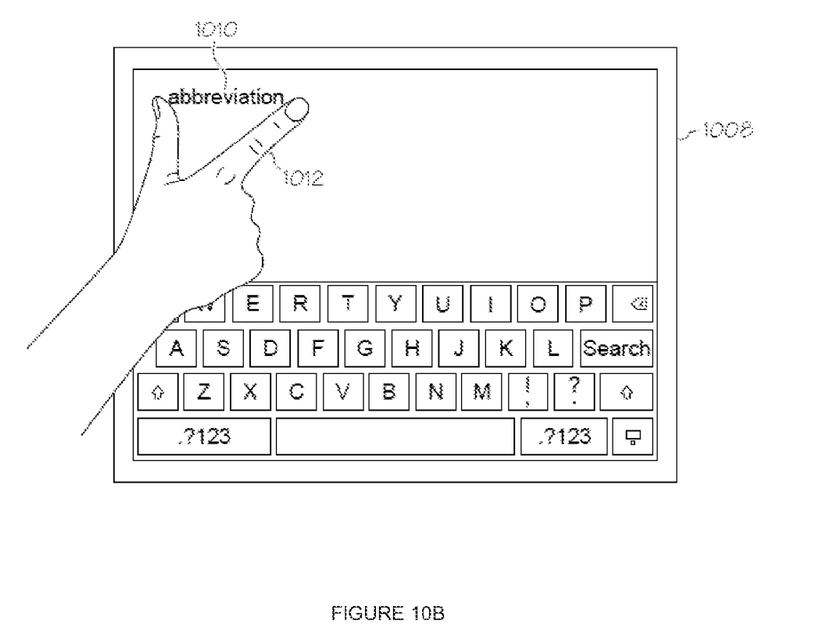
FIG. 10b depicts a user 1012 completing a gesture on an acronym on a touchscreen device 1008 to expand the acronym into a phrase 1012.

FIG. 10*b* depicts a user 1012 completing a gesture on an acronym on a touchscreen device 1008 to expand the acronym into a phrase 1012. In FIG. 10*b* the user 1012 has completed the gesture by moving the two fingers apart. The resulting text is the abbreviation expanded into a phrase 1010.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. In general, the embodiments described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for shortening text on a touchscreen computing device, the method comprising:
    detecting touch input on a touchscreen, wherein the touch input comprises a multi-touch gesture comprising three finger contact points;
    selecting, in response to the touch input, a uniform resource locator (URL) appearing on the touchscreen, wherein the selected URL has a first text length;
    determining the first text length of the selected URL can be shortened;
    determining, based on the multi-touch gesture, a desired text length for the selected URL, wherein the desired text length equates to a determined distance between two finger contact points of the three finger contact points on the touchscreen;
    transmitting the selected URL and a value for the desired text length for the selected URL to a URL shortener for shortening, wherein the URL shortener shortens the selected URL to a shortened version of the selected URL having the desired text length;
    detecting, from the touch input, that at least one text character from the selected URL is to be retained in the shortened version of the selected URL based on a third finger contact point of the three finger contact points positioned between the two finger contact points and based on movement of one of the two finger contact points toward the third finger contact point;
    transmitting an indication of the at least one text character to the URL shortener, wherein the URL shortener is configured to retain the at least one character in the shortened version of the selected URL;
    receiving the shortened version of the selected URL; and
    presenting the shortened version of the selected URL on the touchscreen instead of the selected URL.

2. The method of claim 1, wherein the determining the selected URL comprises determining that at least one of the two finger contact points coincides with one or more characters of a text string for the selected URL.

3. The method of claim 2, wherein the determining the desired text length for the selected URL comprises:
    in response to determining that at least one of the two finger contact points coincides with one or more characters of a text string for the selected URL, detecting a first distance by which the two finger contact points are separated;
    detecting that at least a first of the two fingers contact points is moving toward a second of the two finger contact points on the touchscreen;
    after detecting that the first of the two finger contact points stops moving toward the second of the two finger contact points on the touchscreen, determining a second distance by which the two finger contact points are separated; and
    storing a value for the second distance in a memory storage location of the touchscreen computing device, wherein value for the second distance stored in the memory storage location represents the value for the desired text length for the selected URL.

4. The method of claim 3, wherein the one or more characters of text comprise one or more of a host or path of the selected URL.

5. The method of claim 1, wherein the URL shortener comprises a URL shortener external to the touchscreen computing device.

6. The method of claim 5, further comprising presenting an option, via the touchscreen computing device, for additional user input to select the URL shortener.

7. A computer program product including a non-transitory machine readable medium including computer executable instructions for shortening text on a touchscreen computing device, the instructions comprising:
    instructions to detect touch input on a touchscreen, wherein the touch input comprises a multi-touch gesture comprising three finger contact points;
    instructions to select, in response to the touch input, a uniform resource locator (URL) appearing on the touchscreen, wherein the selected URL has a first text length;
    instructions to determine the first text length of the selected URL can be shortened;
    instructions to determine, based on the multi-touch gesture, a desired text length for the selected URL, wherein the desired text length equates to a determined distance between two finger contact points of the three finger contact points on the touchscreen;
    instructions to transmit the selected URL and a value for the desired text length for the selected URL to a URL shortener for shortening, wherein the URL shortener shortens the selected URL to a shortened version of the selected URL having the desired text length;
    instructions to detect, from the touch input, that at least one text character from the selected URL is to be retained in the shortened version of the selected URL based on a third finger contact point of the three finger contact points positioned between the two finger contact points and based on movement of one of the two finger contact points toward the third finger contact point;
    instructions to transmit an indication of the at least one text character to the URL shortener, wherein the URL shortener is configured to retain the at least one character in the shortened version of the selected URL;
    instructions to receive the shortened version of the selected URL; and
    instructions to present the shortened version of the selected URL on the touchscreen instead of the selected URL.

8. The computer program product of claim 7, wherein the instructions to determine the selected URL comprise instructions to determine that at least one of the two finger contact points coincides with one or more characters of a text string for the selected URL.

9. The computer program product of claim 7, wherein the instructions to determine the desired text length for the selected URL comprise:
    instructions to in response to determining that at least one of the two finger contact points coincides with one or more characters of a text string for the selected URL, detecting a first distance by which the two finger contact points are separated;
    instructions to detect that at least a first of the two fingers contact points is moving toward a second of the two finger contact points on the touchscreen;
    instructions to after detection that the first of the two finger contact points stops moving toward the second of the two finger contact points on the touchscreen, determine a second distance by which the two finger contact points are separated; and
    instructions to store a value for the second distance in a memory storage location of the touchscreen computing device, wherein value for the second distance stored in the memory storage location represents the value for the desired text length for the selected URL.

10. The computer program product of claim 7, wherein the URL shortener comprises a URL shortener external to the touchscreen computing device.

11. The computer program product of claim 7, the instructions further comprising instructions to present an option, via the touchscreen computing device, for additional user input to select the URL shortener.

12. The computer program product of claim 7, wherein the one or more characters of text comprise one or more of a host or path of the selected URL.

13. A system comprising:
    a processor;
    a computer program product including a non-transitory machine readable medium including instructions, executable on the processor, for shortening text on a touchscreen computing device, the instructions comprising:
    instructions to detect touch input on a touchscreen, wherein the touch input comprises a multi-touch gesture comprising three finger contact points;
    instructions to select, in response to the touch input, a uniform resource locator (URL) appearing on the touchscreen, wherein the selected URL has a first text length;
    instructions to determine the first text length of the selected URL can be shortened;
    instructions to determine, based on the multi-touch gesture, a desired text length for the selected URL, wherein the desired text length equates to a determined distance between two finger contact points of the three finger contact points on the touchscreen;
    instructions to transmit the selected URL and a value for the desired text length for the selected URL to a URL shortener for shortening, wherein the URL shortener shortens the selected URL to a shortened version of the selected URL having the desired text length;
    instructions to detect, from the touch input, that at least one text character from the selected URL is to be retained in the shortened version of the selected URL based on a third finger contact point of the three finger contact points positioned between the two finger contact points and based on movement of one of the two finger contact points toward the third finger contact point;
    instructions to transmit an indication of the at least one text character to the URL shortener, wherein the URL shortener is configured to retain the at least one character in the shortened version of the selected URL;
    instructions to receive the shortened version of the selected URL; and
    instructions to present the shortened version of the selected URL on the touchscreen instead of the selected URL.

14. The system of claim 13, wherein the instructions to determine the selected URL comprise instructions to determine that at least one of the two finger contact points coincides with one or more characters of a text string for the selected URL.

15. The system of claim 14, wherein the instructions to determine the desired text length for the selected URL comprise:

instructions to in response to determining that at least one of the two finger contact points coincides with one or more characters of a text string for the selected URL, detecting a first distance by which the two finger contact points are separated;

instructions to detect that at least a first of the two fingers contact points is moving toward a second of the two finger contact points on the touchscreen;

instructions to after detection that the first of the two finger contact points stops moving toward the second of the two finger contact points on the touchscreen, determine a second distance by which the two finger contact points are separated; and instructions to store a value for the second distance in a memory storage location of the touchscreen computing device, wherein value for the second distance stored in the memory storage location represents the value for the desired text length for the selected URL.

16. The system of claim 13, wherein the URL shortener comprises a URL shortener external to the touchscreen computing device.

17. The system of claim 13, the instructions further comprising instructions to present an option, via the touchscreen computing device, for additional user input to select the URL shortener.

18. The computer program product of claim 13, wherein the one or more characters of text comprise one or more of a host or path of the selected URL.

\* \* \* \* \*